(12) United States Patent
Cook (10) Patent No.: US 11,395,457 B2
(45) Date of Patent: Jul. 26, 2022

(54) COMBINE HEADERS WITH FOLD UP CUTTERBARS

(71) Applicant: CNH Industrial America LLC, New Holland, PA (US)

(72) Inventor: Joel T. Cook, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 226 days.

(21) Appl. No.: 16/796,676

(22) Filed: Feb. 20, 2020

(65) Prior Publication Data
US 2021/0259153 A1    Aug. 26, 2021

(51) Int. Cl.
| | | |
|---|---|---|
| *A01B 73/00* | (2006.01) | |
| *A01D 41/14* | (2006.01) | |
| *A01D 57/04* | (2006.01) | |
| *A01D 34/04* | (2006.01) | |
| *A01D 34/28* | (2006.01) | |
| *A01D 57/12* | (2006.01) | |
| *A01D 69/03* | (2006.01) | |
| *A01D 34/14* | (2006.01) | |

(52) U.S. Cl.
CPC .......... *A01D 41/144* (2013.01); *A01B 73/005* (2013.01); *A01D 34/04* (2013.01); *A01D 34/286* (2013.01); *A01D 41/145* (2013.01); *A01D 57/04* (2013.01); *A01D 57/12* (2013.01); *A01D 69/03* (2013.01); *A01D 34/14* (2013.01)

(58) Field of Classification Search
CPC ...... A01B 73/00; A01B 73/005; A01D 34/04; A01D 34/14; A01D 34/243; A01D 34/286; A01D 57/12; A01D 57/04; A01D 41/144
See application file for complete search history.

(56) References Cited

U.S. PATENT DOCUMENTS

| | | | | |
|---|---|---|---|---|
| 802,892 | A * | 10/1905 | Sharp ..................... | A01D 57/04 56/221 |
| 3,258,901 | A * | 7/1966 | Van Der Lely ........ | A01D 41/14 56/228 |
| 4,409,780 | A * | 10/1983 | Beougher .............. | A01B 73/02 172/456 |

(Continued)

FOREIGN PATENT DOCUMENTS

| | | |
|---|---|---|
| CN | 3026913 A1 | 10/2019 |
| EP | 0250649 A1 | 1/1988 |

(Continued)

OTHER PUBLICATIONS

Extended European Search Report for EP Application No. 21158537.7 dated Jul. 5, 2021 (seven pages).

*Primary Examiner* — Adam J Behrens
(74) *Attorney, Agent, or Firm* — Peter K. Zacharias; Patrick M. Sheldrake (57) ABSTRACT

A draper header includes a draper frame and a reel arm. The reel arm is coupled to a reel and pivotally coupled to the draper frame. The draper header further includes a cutterbar pivotally coupled to the draper frame. The reel arm and the cutterbar are configured to pivot about the draper frame to adjust a side profile aspect ratio of the draper header from a first aspect ratio to a second aspect ratio. A height of the first aspect ratio is less than a height of the second aspect ratio, and a width of the first aspect ratio is greater than a width of the second aspect ratio.

19 Claims, 5 Drawing Sheets

(56) References Cited

U.S. PATENT DOCUMENTS

| | | | |
|---|---|---|---|
| 4,715,172 A * | 12/1987 | Mosby | A01D 41/144 |
| | | | 172/311 |
| 5,865,019 A | 2/1999 | Hurlburt | |
| 6,442,918 B1 * | 9/2002 | Fox | A01D 57/03 |
| | | | 56/220 |
| 6,775,969 B2 | 8/2004 | Wuebbels | |
| 7,673,439 B2 * | 3/2010 | Geiser | A01B 73/02 |
| | | | 56/192 |
| 9,032,700 B2 | 5/2015 | Lohrentz | |
| 2014/0230398 A1 * | 8/2014 | Cook | A01D 34/33 |
| | | | 56/298 |
| 2014/0345239 A1 * | 11/2014 | Cook | A01D 34/02 |
| | | | 56/10.1 |
| 2016/0066510 A1 * | 3/2016 | Cook | A01D 57/02 |
| | | | 56/222 |

FOREIGN PATENT DOCUMENTS

| | | |
|---|---|---|
| EP | 2143318 A1 | 1/2010 |
| EP | 3520597 A1 | 8/2019 |
| WO | 2014182926 A1 | 11/2014 |

\* cited by examiner

COMBINE HEADERS WITH FOLD UP CUTTERBARS

TECHNICAL FIELD

The present disclosure relates to combine headers and assemblies, and more specifically to configuring combine headers for transportation.

BACKGROUND

Combine harvesters (or combines) are multipurpose machines for agricultural harvesting operations including reaping, threshing, and winnowing. Combines can perform harvesting operations on crops such as wheat, oats, corn, soybeans, sunflowers, rice, etc. Combines are equipped with removable headers, and in some implementations, headers can be designed for particular crops. For example, a combine can be equipped with a header optimized for harvesting corn, and then the header can be detached from the combine and a header optimized for harvesting wheat can be installed on the combine.

Because combines can be retrofitted with different headers, combines are often sold separately from headers. A customer can purchase a combine from one location and a header from another location. In some cases, a customer already has a combine and is in need of a new header and decides to purchase only a header from a dealership. Because combines and headers in general are very specialized machinery mostly utilized in agricultural settings, dealerships that sell combines are not as densely packed geographically when compared to consumer car dealerships. As such, when demand exceeds supply, customers may have to order products from the dealerships in advance, dealerships may then need to alert combine and/or combine headers manufacturers of product shortage, and the manufacturers may need to ship new products to the dealerships.

Shipping combines and combine headers from one location to another can be expensive. The present disclosure provides combine header designs for reducing costs associated with shipping and addressing other problems that may arise due to shipping.

SUMMARY

According to some implementations of the present disclosure, a draper header is provided. The draper header includes a draper frame and a reel arm. The reel arm is coupled to a reel and pivotally coupled to the draper frame. The draper header further includes a cutterbar pivotally coupled to the draper frame. The reel arm and the cutterbar are configured to pivot about the draper frame to adjust a side profile aspect ratio of the draper header from a first aspect ratio to a second aspect ratio. A height of the first aspect ratio is less than a height of the second aspect ratio, and a width of the first aspect ratio is greater than a width of the second aspect ratio.

According to some implementations of the present disclosure, a method for configuring a draper header for shipping is provided. A reel arm of the draper header is pivoted about a draper frame of the draper header from a first reel arm position to a second reel arm position, wherein the reel arm of the draper header is coupled to a reel and is pivotally coupled to the draper frame of the draper header. A cutterbar of the draper header is pivoted about the draper frame of the draper header from a first cutterbar position to a second cutterbar position, wherein the cutterbar of the draper header is pivotally coupled to the draper frame of the draper header. Pivoting the reel arm of the draper header from the first reel arm position to the second reel arm position and pivoting the cutterbar of the draper header from the first cutterbar position to the second cutterbar position adjust a side profile aspect ratio of the draper header from a first aspect ratio to a second aspect ratio. A height of the first aspect ratio is less than a height of the second aspect ratio, and a width of the first aspect ratio is greater than a width of the second aspect ratio.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

While the present disclosure is susceptible to various modifications and alternative forms, specific implementations have been shown by way of example in the drawings and will be described in detail herein. It should be understood, however, that the present disclosure is not intended to be limited to the particular forms disclosed. Rather, the present disclosure is to cover all modifications, equivalents, and alternatives within the spirit and scope of the present disclosure as defined by the appended claims.

DETAILED DESCRIPTION

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at, near, or nearly at," or "within 3-5% of," or "within acceptable manufacturing tolerances," or any logical combination thereof, for example.

Combine headers come in different flavors or types. For example, there are grain headers, flex headers, corn headers, pick-up headers, draper headers, etc. Embodiments of the present disclosure will be illustrated with draper headers. Draper headers are merely used as an example, and some embodiments can be applied to a different type of combine header. Compared to grain headers and flex headers, draper headers do not have a full length auger for feeding crops to the center of the header. Instead draper headers have one or more belts that feed crops from the sides of the header to the center of the header.

Figure 1:
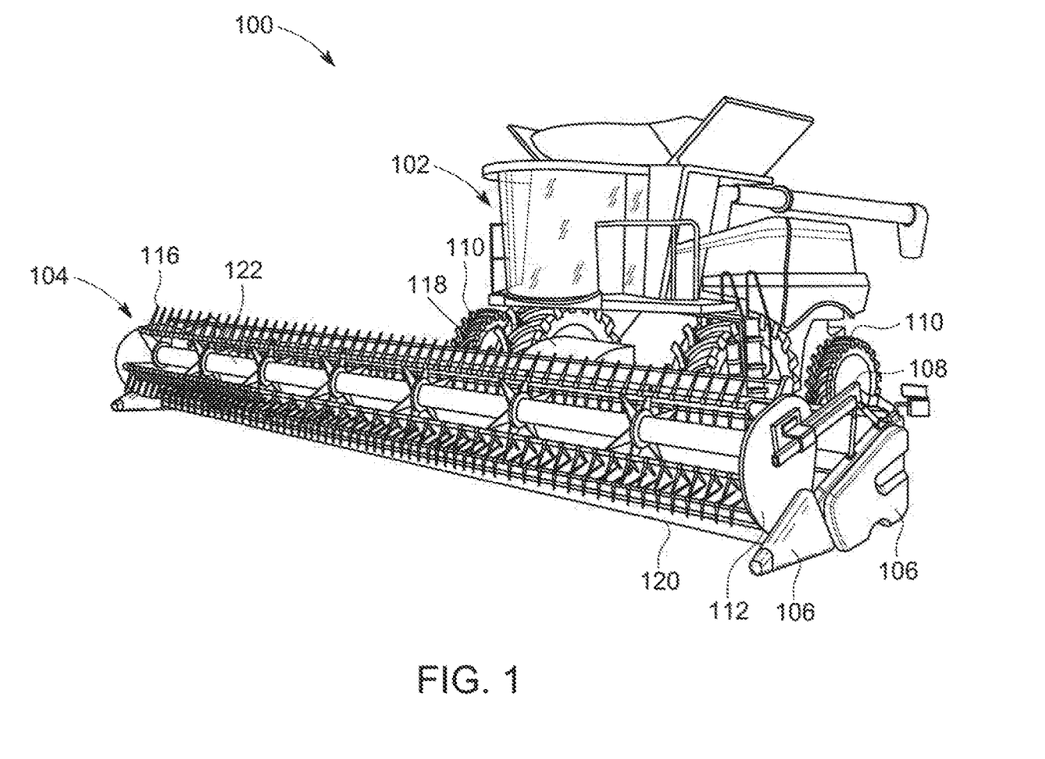
FIG. 1 illustrates a front perspective view of a combine with an attached header according to some implementations of the present disclosure.

FIG. 1 illustrates a front perspective view of a combine harvester system 100 according to some implementations of the present disclosure. The combine harvester system 100 includes a combine 102 attached to a header 104. In some implementations, the header 104 is a draper header. The header 104 attaches to the combine 102 at a feeder house 118. The combine 102 includes wheels 110 for propelling the combine harvester system 100 in a forward direction while the combine harvester system 100 is performing harvesting operations.

In FIG. 1, the header 104 attached to the combine 102 includes a reel 112, a decorative cover 106 covering a frame of the header 104, and a bottom deck 120 including a plurality of knives or teeth. As the combine harvester system 100 travels in the forward direction, the knives on the bottom deck 120 cut crops at a certain height. The height where crops are cut is dependent on a relative height of the knives from the ground. As the crops are being cut, the reel 112 rotates in a direction that facilitates the cut crops to be collected on the bottom deck 120. The reel 112 is supported on the frame of the header 104 by one or more supporting bars 108. The reel 112 includes a cylindrical member 122 with extensions that support a plurality of tines 116. The plurality of tines 116 facilitate collecting the cut crops on the bottom deck 120. The bottom deck 120 can be a flexible component where parts within the bottom deck 120 can move relative to each other. The bottom deck 120 includes a feeder system (not shown) for directing the collected cut crops to the feeder house 118. The feeder system in a grain header is an auger, and the feeder system in a draper header are conveyor belts.

Figure 2:
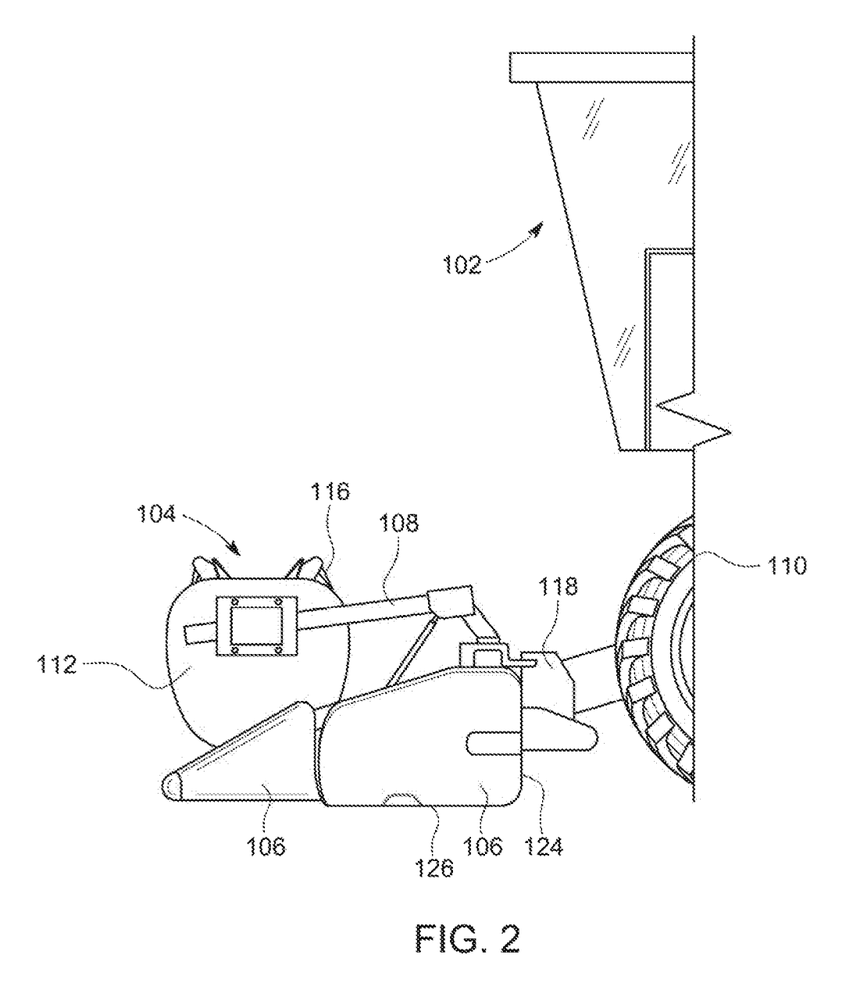
FIG. 2 illustrates a side view of the combine with the attached header of FIG. 1.

FIG. 2 illustrates a side view of the combine 102 with the header 104 of FIG. 1. The header 104 can range from 20 feet to 50 feet long in a direction transverse to the forward direction of travel of the combine harvester system 100. In some implementations, the header 104 can weigh in excess of 5,000 pounds ("lbs"), even reaching 15,000 lbs. Preparing the header 104 for shipping to a dealership or for shipping to a customer can be an involved process. Referring to FIG. 2, current headers are shipped or transported in a configuration as shown by the header 104. For example, the header 104 can be placed on a tractor flatbed trailer with the bottom plane 126 of the header 104 facing a floor of the tractor flatbed trailer. The header 104 can also be placed on a tractor flatbed trailer with the back plane 124 of the header 104 facing the floor of the tractor flatbed trailer.

Figure 3:
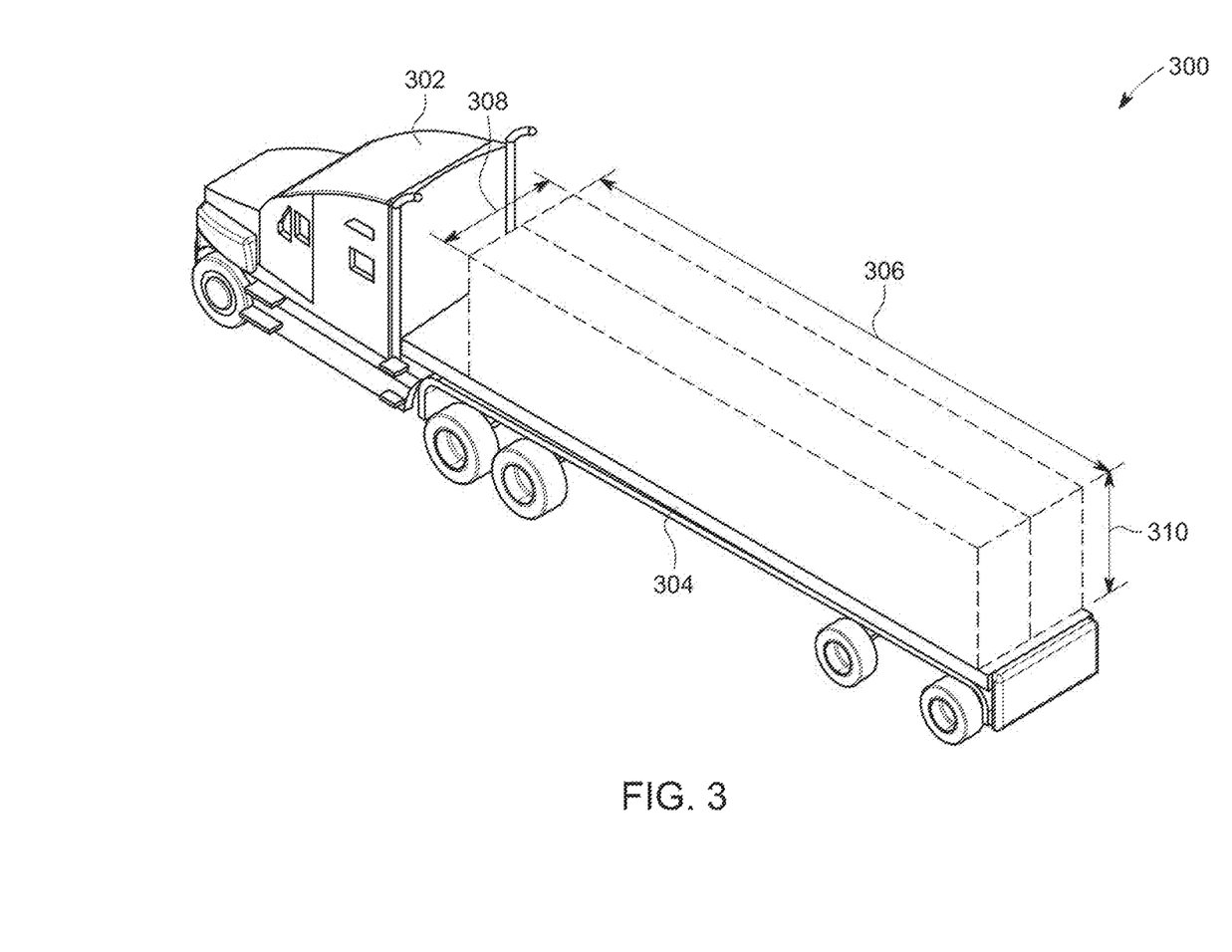
FIG. 3 illustrates a back perspective view of a tractor flatbed trailer according to some implementations of the present disclosure.

FIG. 3 illustrates a back perspective view of a tractor flatbed trailer 300 with a tractor section 302 and trailer section 304. Items to be transported on the tractor flatbed trailer 300 should be contained within a volume defined by a length 306, a width 308, and a height 310. For example, when shipping the header 104 on the tractor flatbed trailer 300, the dimensions of the header 104 should be contained within the volume defined by the length 306, the width 308, and the height 310. The header 104 in FIG. 2, when shipped with the bottom plane 126 facing the floor of the trailer section 304, is loaded on the trailer section 304 such that a height of the header 104 is less than the height 310 and a width of the header 104 is less than the width 308. A drawback to shipping the header 104 in this configuration is that only one header can fit on the trailer section 304. In some implementations, the tractor flatbed trailer 300 can be reconfigured to have two levels such that two headers can be placed, one above the other, on the trailer section 304. Having two levels introduces additional costs because reconfiguring the trailer section 304 for combine headers can require specialized labor, and loading two headers on such a reconfigured trailer can be challenging and can require specialized equipment.

Another way to ship the header 104 of FIG. 2 on the tractor flatbed trailer 300 is to rotate the header such that the back plane 124 of the header 104 faces the floor of the trailer section 304. In this configuration, two headers can be placed on the trailer section 304 with each taking up half the volume of the trailer section 304 as indicated in dotted lines in FIG. 3. In such a configuration, the reel 112 of the header 104 faces up while the back plane 124 of the header 104 faces the floor of the trailer section 304. Drawbacks are associated with such a shipping configuration. For example, some parts of the header 104 are disassembled or broken down and the header 104 is rolled up to a vertical position. When the header 104 is transported to its final destination, then the header 104 is rolled down to its operating position as shown in FIG. 2. The process of rolling down the header 104 can damage the header 104. In some cases, when a manufacturer ships the header 104 to a dealer, in order for the dealer to change orientation of the header 104, the dealer merely pushes the header 104 over so that the header 104 falls down. Due to weight and size of the header 104, pushing the header down into its operating position can end up damaging the header 104. The dealer may not have proper equipment to slowly roll down the header 104 to its operating position for interfacing with a combine. As such, embodiments of the present disclosure provide a header design and a method of shipping a header in an orientation that can be directly attached to a combine without a need for "rolling down" the header. Embodiments of the present disclosure reduce a risk of damaging combine headers when unloading from a tractor flatbed trailer.

Figure 4:
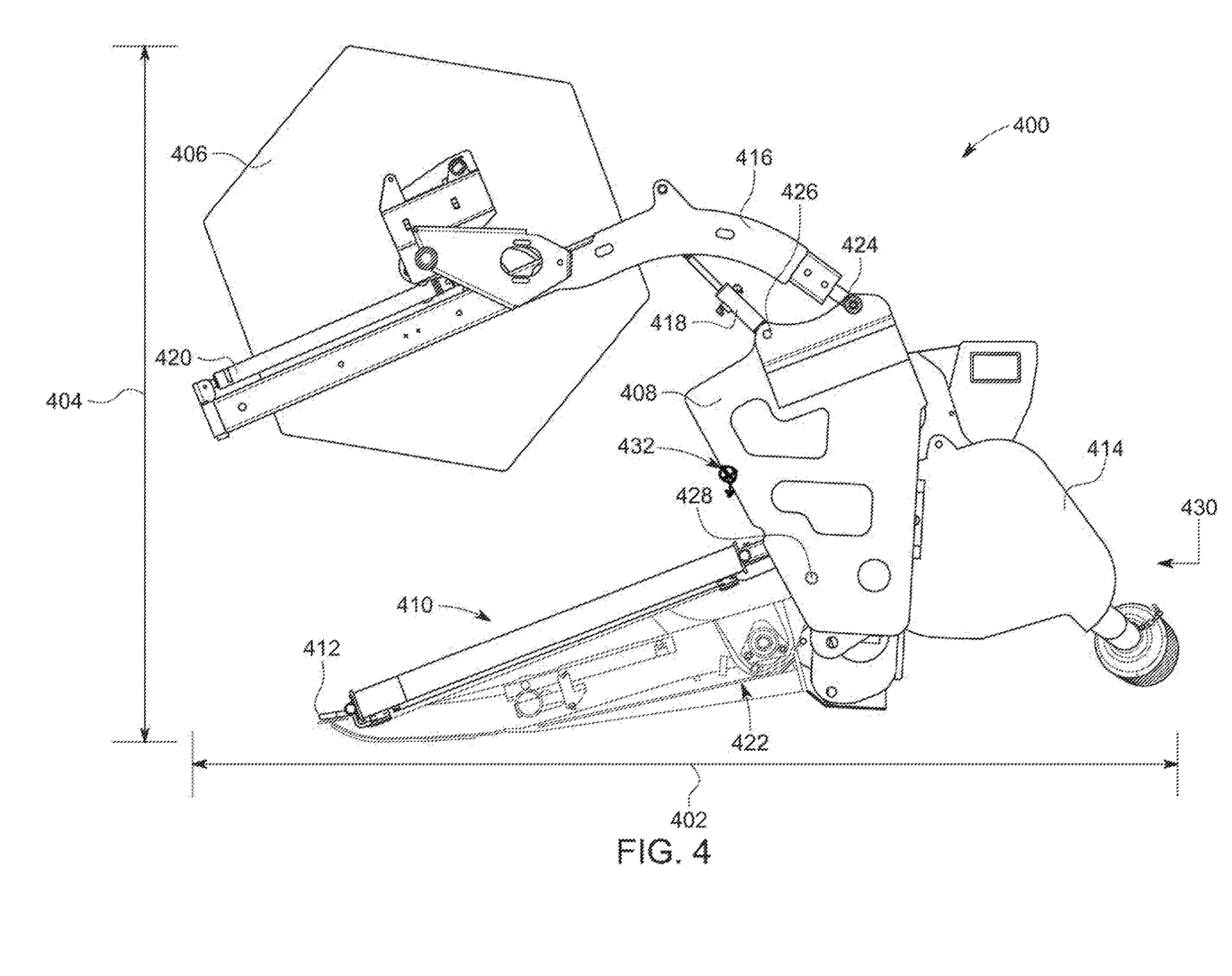
FIG. 4 illustrates a side view of a draper header in an operating configuration according to some implementations of the present disclosure.

Referring to FIG. 4, a side view of a draper header 400 in an operating position is provided according to some implementations of the present disclosure. The draper header 400 of FIG. 4 is merely used for illustrative purposes and does not limit application of embodiments of the present disclosure to other types of headers. The draper header 400 of FIG. 4 is depicted without a decorative cover, thus exposing mechanical components that would have otherwise been covered by the decorative cover. The draper header 400 has a side profile aspect ratio defined by a first width 402 and a first height 404. A combine connects to or attaches to the draper header 400 in the direction 430. The draper header 400 includes a reel 406, a frame 408, a cutterbar 410, and a mechanical controller 414. The mechanical controller 414 can be a gearbox configured to drive functional parts of the draper header 400 (e.g., the gearbox can control movement of conveyor belts, etc.).

The reel 406 is connected to and supported on the frame 408 via a reel arm 416. An actuator 418, represented as a hydraulic cylinder, is connected to the reel arm 416 on one end and connected to the frame 408 at a pivot point 426. The actuator 418 indirectly couples the reel arm 416 to the frame 408. The actuator 418 is configured to move the reel arm 416 up and down such that the reel arm 416 pivots at a pivot attachment point 424. The reel arm 416 is directly coupled to the frame 408 at the pivot attachment point 424. Moving the reel arm 416 up and down with the actuator 418 adjusts a height of the reel 406 with respect to the ground.

The reel arm 416 can have a bent section and one or more straight sections. In FIG. 4, the reel arm 416 has the reel 406 mounted on a straight section of the reel arm 416. The reel 406 is configured to slide along the straight section of the reel arm 416. An actuator 420, represented as a hydraulic cylinder, facilitates sliding of the reel 406 along the straight section of the reel arm 416. In FIG. 4, sliding the reel 406 along the reel arm 416 toward the frame 408 increases the height of the reel 406 with respect to the ground, and sliding the reel 406 along the reel arm 416 away from the frame 408 decreases the height of the reel 406 with respect to the ground. As such, the height of the reel 406 can be adjusted via the actuators 418 and 420 to position the reel 406 at a certain height with respect to the ground.

The cutterbar 410 includes knives 412 and one or more belts (e.g., a center belt 422). The cutterbar 410 can be flexible with parts that move relative to other parts (e.g., the cutterbar 410 can flex over uneven ground and is not a single rigid piece). The cutterbar 410 can include lateral belts with a series of flex arms that allow the cutterbar 410 to flex and hover a certain distance from the ground even when the ground is uneven. The cutterbar 410 is configured to rotate about a reference point 428. Rotating the cutterbar 410 adjusts a height of the knives 412 relative to the ground, allowing the cutterbar 410 to follow the ground such that crops can be cut at a set height. With the actuators 418 and 420 and the rotation of the cutterbar 410, a distance between the knives 412 and the reel 406 can be adjusted for different crops being harvested with the draper header 400 of FIG. 4.

Conventional draper headers that support cutterbar rotation rotate cutterbars at most 10 degrees. The 10 degrees of rotation translates to about 8 inches of vertical movement of conventional draper headers' cutterbars. The 10-degree rotational limit in conventional draper headers stems from a need to have cutterbars substantially horizontal so that lateral belts can move crops over to the center belts. Once crops are cut, the crops sit on the belts due to gravity. As such, a larger angle of rotation of the cutterbars can substantially reduce operational efficiency of draper headers. Furthermore, larger angles of rotation do not allow cutterbars to follow the ground. For example, rotating a cutterbar in a manner that the knives of the cutterbar are 3 feet off the ground will not be conducive to cutting crops. And in that scenario, the frame to which the cutterbar is attached would be lower than the knives, rendering the cutterbar non-operational for harvesting purposes. In contrast to conventional draper headers, the draper header 400 of FIG. 4 can be designed for a higher degree of rotation for other purposes.

Figure 5:
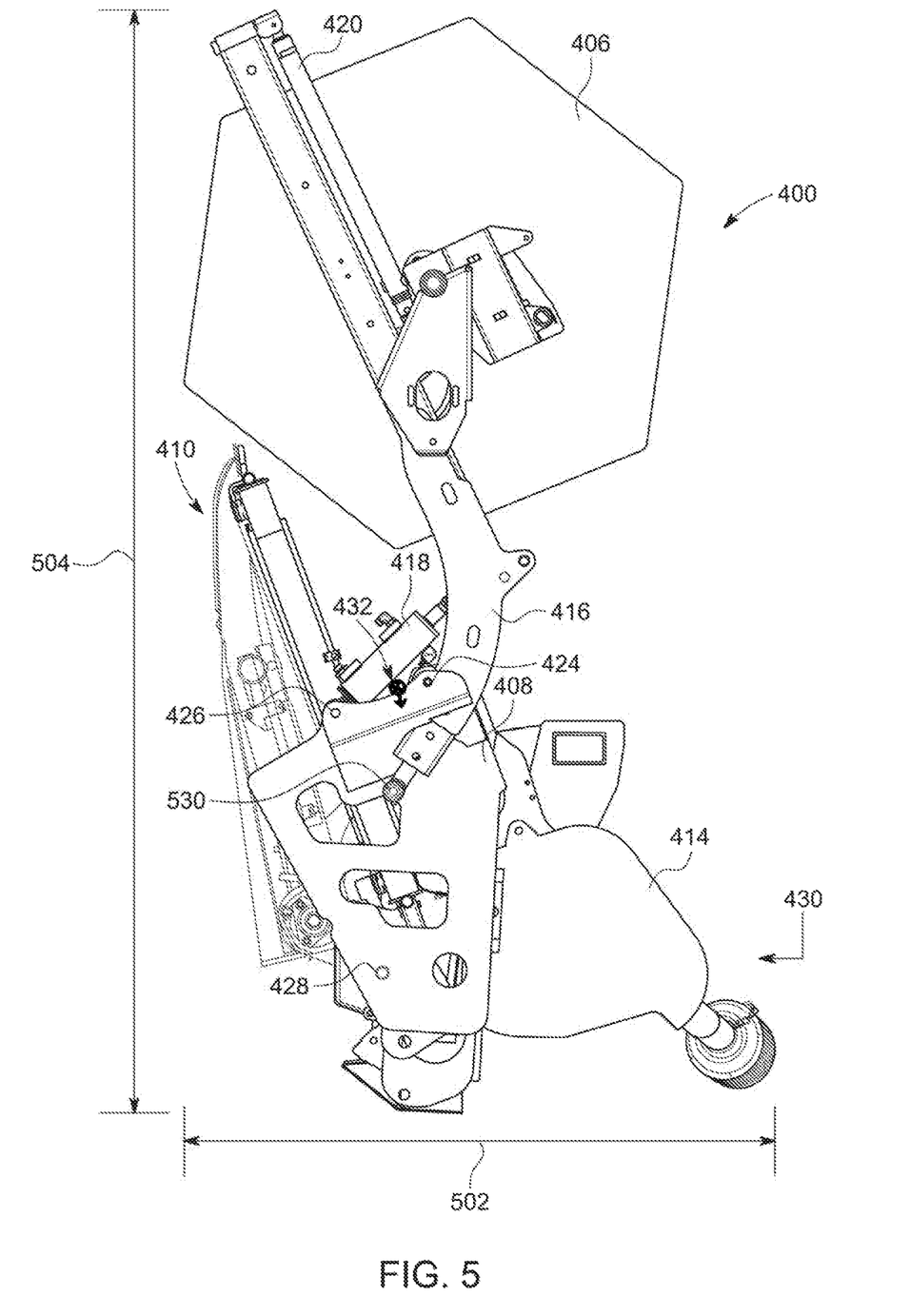
FIG. 5 illustrates the draper header of FIG. 4 in a shipping configuration according to some implementations of the present disclosure.

For shipping and/or storage purposes, the side profile aspect ratio of the draper header 400 of FIG. 4 can be adjusted between a first profile (defined by the first height 404 and the first width 402) and a second profile (defined by a second height 504 and a second width 502) as depicted in FIG. 5. Notice that a center of gravity 432 of the draper header 400 shifts from a side of the frame 408 (as depicted in FIG. 4) to a top of the frame 408 (as depicted in FIG. 5) due to adjusting between the first profile and the second profile. FIG. 5 illustrates the draper header 400 of FIG. 4 in a shipping configuration, according to some implementations of the present disclosure. Referring to FIG. 5, the cutterbar 410 can be rotated more than 10 degrees such that the cutterbar 410 transitions from a substantially horizontal position (as depicted in FIG. 4) to a substantially vertical position. In some implementations the cutterbar 410 is rotated between 80 degrees to 90 degrees around the reference point 428.

To make room for rotating the cutterbar 410 to a substantially vertical position, the reel 406 should be moved. Moving the reel 406 prevents the cutterbar 410 and/or the reel 406 from sustaining damage. Thus, the reel arm 416 is configured to rotate around the pivot point 426 such that the straight section of the reel arm 416 on which the reel 406 sits moves from a substantially horizontal position to a substantially vertical position. Rotating the reel arm 416 can be accomplished by pivoting the actuator 418 at the pivot point 426 between 80 degrees to 90 degrees. In some implementations, to support such a pivot angle, an end 530 of the reel arm 416 is detachable from the pivot attachment point 424 of the frame 408. In some implementations, the reel 406 is first rotated upwards before the cutterbar 410 is rotated. In some implementations, the cutterbar 410 and the reel 406 are both rotated at a same time.

The end 530 of the reel arm 416 moves downward from the pivot attachment point 424 and can be secured at different location on the frame 408. In some implementations, a latch or a hook is provided in the frame 408 such that the reel arm 416 is secured by the latch or the hook in the shipping configuration depicted in FIG. 5. In some implementations, the frame 408 is designed to include a section for catching a portion of the reel arm 416 in the shipping configuration as depicted in FIG. 5.

Alternatively, in some implementations, instead of only pivoting the actuator 418 at the pivot point 426 as shown between FIGS. 4 and 5, the reel arm 416 is pivoted at the pivot attachment point 424. That way the reel arm 416 is still attached to the frame 408 at the pivot attachment point 424 when the reel arm 416 is rotated from a substantially horizontal position to a substantially vertical position. In some implementations, the actuator 418 is detachable from the frame 408 at the pivot point 426 to facilitate pivoting the reel arm 416 at the pivot attachment point 424.

Once in the shipping configuration, the second height 504 can be adjusted by sliding the reel 406 along the reel arm 416 toward the frame 408. Sliding the reel 406 toward the frame 408 decreases the distance between the reel 406 and the knives 412. Sliding the reel 406 away from the frame 408 increases the distance between the reel 406 and the knives 412 and can potentially increase the second height 504.

In some implementations, the operating configuration in FIG. 4 has dimensions where the first height 404 and the first width 402 are 4 feet and 8.5 feet, respectively. After placing the draper header 400 in the shipping configuration in FIG. 5, the second height 504 and the second width 502 can be 8.5 feet and 4 feet, respectively. Due to keeping a same orientation of the draper header 400 between FIG. 4 and FIG. 5 such that a combine engages the header from the direction 430, there is no need to roll the header to a different orientation for shipping. As such, no need for specialized equipment to load and/or unload headers from tractor flatbed trailers.

In some implementations, a combine can be used to load a header for shipping and/or unload a shipped header. Since the header can be shipped in an orientation that the combine can engage the header, the combine instead of specialized equipment can be used to move the header when loading the header for shipping and/or when unloading the header after being shipped. Furthermore, by reducing a width of the header for shipping, two headers can be shipped at once in a same orientation for engaging with a combine. None of the two headers being shipped need to be rolled to a different orientation to fit on shipping tractors.

Alternative Implementations

Alternative Implementation 1. A draper header is provided. The draper header includes a draper frame, a reel arm coupled to a reel and pivotally coupled to the draper frame, and a cutterbar pivotally coupled to the draper frame. The reel arm and the cutterbar are configured to pivot about the draper frame to adjust a side profile aspect ratio of the draper header from a first aspect ratio to a second aspect ratio. A height of the first aspect ratio is less than a height of the second aspect ratio, and a width of the first aspect ratio is greater than a width of the second aspect ratio.

Alternative Implementation 2. The draper header of alternative implementation 1, wherein when the draper header is in an operating configuration, the side profile aspect ratio of the draper header is the first aspect ratio, and when the draper header is in a shipping configuration, the side profile aspect ratio of the draper header is the second aspect ratio.

Alternative Implementation 3. The draper header of any of the alternative implementations 1 or 2, wherein the width of the first aspect ratio is less than about 8.5 feet and the width of the second aspect ratio is about 4 feet.

Alternative Implementation 4. The draper header of any of the alternative implementations 1-3, wherein the reel arm is configured to pivot approximately 80 to 90 degrees around a first pivot point in relation to the draper frame when adjusting the side profile aspect ratio from the first aspect ratio to the second aspect ratio.

Alternative Implementation 5. The draper header of any of the alternative implementations 1-4, wherein the cutterbar is configured to pivot approximately 80 to 90 degrees around a second pivot point in relation to the draper frame when adjusting the side profile aspect ratio from the first aspect ratio to the second aspect ratio.

Alternative Implementation 6. The draper header of any of the alternative implementations 1-5, wherein the height of the first aspect ratio is equal to the width of the second aspect ratio and the width of the first aspect ratio is equal to the height of the second aspect ratio.

Alternative Implementation 7. The draper header of any of the alternative implementations 1-6, further includes a first actuator coupled to the reel arm and the reel. The first actuator is configured to slide the reel along a length of the reel arm to adjust a distance between the draper frame and the reel. Reducing the distance between the draper frame and the reel by the first actuator reduces a distance between the reel and a knife of the cutterbar when the side profile aspect ratio of the draper header is the second aspect ratio.

Alternative Implementation 8. The draper header of alternative implementation 7, wherein the reel arm includes a bent section and at least one straight section. The first actuator is configured to slide the reel along the length of the reel arm by sliding the reel along one of the at least one straight section of the reel arm.

Alternative Implementation 9. The draper header of any of the alternative implementations 7 or 8, wherein the first actuator is a hydraulic cylinder.

Alternative Implementation 10. The draper header of alternative implementation 9, wherein the reel arm includes a first end and a second end. The first end is coupled to the hydraulic cylinder, and the second end is removably coupled to the draper frame at a pivot attachment point.

Alternative Implementation 11. The draper header of alternative implementation 10, wherein the second end of the reel arm is attached to the pivot attachment point when the side profile aspect ratio of the draper header is the first aspect ratio.

Alternative Implementation 12. The draper header of any of alternative implementations 10-11, wherein the reel arm is coupled to the draper frame via a second actuator, the second actuator being attached to a first pivot point on the draper frame and being attached to a position along the length of the reel arm such that rotating the second actuator about the first pivot point rotates the reel arm about the first pivot point.

Alternative Implementation 13. The draper header of any of alternative implementations 10-12, wherein the second end of the reel arm is detached from the pivot attachment point when the side profile aspect ratio of the draper header is the second aspect ratio.

Alternative Implementation 14. The draper header of any of the alternative implementations 1-13, wherein when adjusting the side profile aspect ratio from the first aspect ratio to the second aspect ratio, the reel arm is pivoted before pivoting the cutterbar.

Alternative Implementation 15. The draper header of any of the alternative implementations 1-14, wherein adjusting the side profile aspect ratio from the first aspect ratio to the second aspect ratio shifts a center of gravity of the draper header, wherein the center of gravity shifts horizontally towards the reel arm and vertically towards a top of the draper frame.

Alternative Implementation 16. A method for configuring a draper header for shipping includes: (a) pivoting a reel arm of the draper header about a draper frame of the draper header from a first reel arm position to a second reel arm position, wherein the reel arm of the draper header is coupled to a reel and is pivotally coupled to the draper frame of the draper header; and (b) pivoting a cutterbar of the draper header about the draper frame of the draper header from a first cutterbar position to a second cutterbar position, wherein the cutterbar of the draper header is pivotally coupled to the draper frame of the draper header. Pivoting the reel arm of the draper header from the first reel arm position to the second reel arm position and pivoting the cutterbar of the draper header from the first cutterbar position to the second cutterbar position adjust a side profile aspect ratio of the draper header from a first aspect ratio to a second aspect ratio. A height of the first aspect ratio is less than a height of the second aspect ratio, and a width of the first aspect ratio is greater than a width of the second aspect ratio.

Alternative Implementation 17. The method of alternative implementation 16, wherein when the draper header is in an operating configuration, the side profile aspect ratio of the draper header is the first aspect ratio, and when the draper header is in a shipping configuration, the side profile aspect ratio of the draper header is the second aspect ratio.

Alternative Implementation 18. The method of alternative implementations 16 or 17, wherein the width of the first aspect ratio is less than about 8.5 feet and the width of the second aspect ratio is about 4 feet.

Alternative Implementation 19. The method of any of the alternative implementations 16-18, wherein the first cutterbar position and the second cutterbar position are separated by a pivot angle of approximately 80 to 90 degrees.

Alternative Implementation 20. The method of any of the alternative implementations 16-19, wherein the first reel arm position and the second reel arm position are separated by a pivot angle of approximately 80 to 90 degrees.

Alternative Implementation 21. The method of any of the alternative implementations 16-20, wherein the reel arm is first pivoted from the first reel arm position to the second reel arm position before the cutterbar is pivoted from the first cutterbar position to the second cutterbar position.

While the present disclosure has been described with reference to one or more particular implementations, those skilled in the art will recognize that many changes may be made thereto without departing from the spirit and scope of the present disclosure. Each of these embodiments and implementations and obvious variations thereof is contemplated as falling within the spirit and scope of the present disclosure, which is set forth in the claims that follow.

What is claimed is:

1. A draper header, comprising:
    a draper frame;
    a reel arm coupled to a reel and pivotally coupled to the draper frame;
    a cutterbar pivotally coupled to the draper frame; and
    a first actuator coupled to the reel arm and the reel, the first actuator configured to slide the reel along a length of the reel arm to adjust a distance between the draper frame and the reel;
    wherein the reel arm and the cutterbar are configured to pivot about the draper frame to adjust a side profile aspect ratio of the draper header from a first aspect ratio to a second aspect ratio, wherein a height of the first aspect ratio is less than a height of the second aspect ratio and a width of the first aspect ratio is greater than a width of the second aspect ratio, and wherein reducing the distance between the draper frame and the reel by the first actuator reduces a distance between the reel and a knife of the cutterbar when the side profile aspect ratio of the draper header is the second aspect ratio.

2. The draper header of claim 1, wherein when the draper header is in an operating configuration, the side profile aspect ratio of the draper header is the first aspect ratio, and when the draper header is in a shipping configuration, the side profile aspect ratio of the draper header is the second aspect ratio.

3. The draper header of claim 1, wherein the width of the first aspect ratio is less than about 8.5 feet and the width of the second aspect ratio is about 4 feet.

4. The draper header of claim 1, wherein the reel arm is configured to pivot approximately 80 to 90 degrees around a first pivot point in relation to the draper frame when adjusting the side profile aspect ratio from the first aspect ratio to the second aspect ratio.

5. The draper header of claim 1, wherein the cutterbar is configured to pivot approximately 80 to 90 degrees around a second pivot point in relation to the draper frame when adjusting the side profile aspect ratio from the first aspect ratio to the second aspect ratio.

6. The draper header of claim 1, wherein the height of the first aspect ratio is equal to the width of the second aspect ratio and the width of the first aspect ratio is equal to the height of the second aspect ratio.

7. The draper header of claim 1, wherein the reel arm includes a bent section and at least one straight section and the first actuator sliding the reel along the length of the reel arm is sliding the reel along one of the at least one straight section of the reel arm.

8. The draper header of claim 1, wherein the first actuator is a hydraulic cylinder.

9. The draper header of claim 8, wherein the reel arm comprises a first end and a second end, the first end coupled to the hydraulic cylinder and the second end removably coupled to the draper frame at a pivot attachment point.

10. The draper header of claim 9, wherein the second end of the reel arm is attached to the pivot attachment point when the side profile aspect ratio of the draper header is the first aspect ratio.

11. The draper header of claim 9, wherein the reel arm is coupled to the draper frame via a second actuator, the second actuator being attached to a first pivot point on the draper frame and being attached to a position along the length of the reel arm such that rotating the second actuator about the first pivot point rotates the reel arm about the first pivot point.

12. The draper header of claim 11, wherein the second end of the reel arm is detached from the pivot attachment point when the side profile aspect ratio of the draper header is the second aspect ratio.

13. The draper header of claim 1, wherein when adjusting the side profile aspect ratio from the first aspect ratio to the second aspect ratio, the reel arm is pivoted before pivoting the cutterbar.

14. The draper header of claim 1, wherein adjusting the side profile aspect ratio from the first aspect ratio to the second aspect ratio shifts a center of gravity of the draper header, wherein the center of gravity shifts horizontally towards the reel arm and vertically towards a top of the draper frame.

15. A method for configuring a draper header for shipping, comprising:
    pivoting a reel arm of the draper header about a draper frame of the draper header from a first reel arm position to a second reel arm position, wherein the reel arm of the draper header is coupled to a reel and is pivotally coupled to the draper frame of the draper header;
    pivoting a cutterbar of the draper header about the draper frame of the draper header from a first cutterbar position to a second cutterbar position, wherein the cutterbar of the draper header is pivotally coupled to the draper frame of the draper header; and
    sliding the reel along a length of the reel arm using a first actuator coupled to the reel arm and the reel in order to adjust a distance between the draper frame and the reel,
    wherein pivoting the reel arm of the draper header from the first reel arm position to the second reel arm position and pivoting the cutterbar of the draper header from the first cutterbar position to the second cutterbar position adjust a side profile aspect ratio of the draper header from a first aspect ratio to a second aspect ratio,
    wherein a height of the first aspect ratio is less than a height of the second aspect ratio and a width of the first aspect ratio is greater than a width of the second aspect ratio, and
    wherein reducing the distance between the draper frame and the reel by the first actuator reduces a distance between the reel and a knife of the cutterbar when the side profile aspect ratio of the draper header is the second aspect ratio.

16. The method of claim 15, wherein when the draper header is in an operating configuration, the side profile aspect ratio of the draper header is the first aspect ratio, and when the draper header is in a shipping configuration, the side profile aspect ratio of the draper header is the second aspect ratio.

17. The method of claim 15, wherein the width of the first aspect ratio is less than about 8.5 feet and the width of the second aspect ratio is about 4 feet.

18. The method of claim 15, wherein the first cutterbar position and the second cutterbar position are separated by a pivot angle of approximately 80 to 90 degrees.

19. The method of claim 15, wherein the reel arm is first pivoted from the first reel arm position to the second reel arm position before the cutterbar is pivoted from the first cutterbar position to the second cutterbar position.

\* \* \* \* \*